July 3, 1962

R. B. BAGSHAW 3,041,999

COATING APPARATUS HAVING SPRAY PATH ADJUSTING MECHANISM

Original Filed Feb. 13, 1958

Robert B. Bagshaw
INVENTOR.

BY
ATTORNEY

Patented July 3, 1962

3,041,999
COATING APPARATUS HAVING SPRAY PATH ADJUSTING MECHANISM
Robert B. Bagshaw, Huntingdon, Pa., assignor to Wald Industries, Inc., Huntingdon, Pa., a corporation of Pennsylvania
Continuation of application Ser. No. 837,373, Sept. 1, 1959, which is a division of application Ser. No. 715,114, Feb. 13, 1958. This application Mar. 14, 1961, Ser. No. 95,679
7 Claims. (Cl. 118—323)

The present invention relates to coating apparatus, and more particularly to a coating apparatus comprising a spray gun which is laterally movable over a work supporting conveyor and having simultaneously adjustable mechanism associated therewith for determining the width in which the spray gun is operative to discharge spray therefrom.

The present application is a continuation of my copending application Ser. No. 837,373, filed September 1, 1959, and now abandoned, which was a division of application Ser. No. 715,114, filed February 13, 1958, by John R. Wald, Rufus W. Wilson and Robert B. Bagshaw, now issued as Patent No. 3,009,439, dated November 21, 1961.

The spraying of multiple work pieces by automatic equipment has progressed through the years, and many workers have provided apparatus in which a conveyor carries the work pieces and has a spray gun movably mounted thereabove. In particular, the spray gun is mounted on a carriage and the carriage is moved by an endless chain, belt, or the like. The carrier has mechanism thereon which engages with the lower run of the chain and which moves with that lower run from one side of the conveyor to the other, and upon reaching the other side the mechanism moves from the one run of the chain to the other run of the chain to thereby cause the carriage to move across the conveyor in the opposite direction.

It was soon recognized that it was desirable to prevent the spray gun from spraying over the full path of its travel, as spray often was projected beyond the sides of the work, and so means were provided to close a valve in a conduit leading to the spray gun adjacent either end of the path of movement of the spray gun. To this end, in particular, fixed blocks or depressions in rails were used, these blocks or depressions being engaged by a valve operating member carried by the spray gun or its carriage.

Subsequently, it was recognized such apparatus could be used for different pieces of work having different widths, and to provide for this occurrence, the workers in the art produced equipment in which the valve operator tripping members were movable. Typically, abutment members were provided adjacent the ends of the path of the spray gun carriage and these abutments were carried by telescopic rods which could be adjusted individually by means of set screws or clamps. In order to reset an abutment-carrying rod, it was necessary to stop the work conveyor in order to permit a workman to unloosen the set screws or clamps, to adjust one of the abutment-carrying rods, then to reset that rod and subsequently move to the other abutment-carrying rod and repeat the operation.

It has been recognized that the shutting down of the conveyor line was costly, in time expended, as well as in changing the conditions throughout the line, such as in heating ovens associated with the line.

Other workers provided more advanced apparatus in which cams at either side of the conveyor could be simultaneously moved without halting the conveyor, but the construction was such that for wide spray widths, these cams would necessarily extend beyond the normal width of the machine, with the result that either a hazard was created or the machine had to be made unduly wide, with resultant increase in required floor space.

An object of the present invention is to provide a coating apparatus which will not require the shutting down of a paint spray line in order to spray different sizes of work.

Another object of the present invention is to provide a coating apparatus having a spray gun on a reciprocating carriage in which the points at which the supply of fluid to the spray gun is cut off at either end of the spray path may be simultaneously adjusted.

Yet another object of the present invention is the provision of a coating apparatus having a spray gun carried by a reciprocating carriage in which the width of the spray may be controlled by a single control member conveniently placed exteriorly of the apparatus.

A further object of the present invention is to provide a coating apparatus in which the width of the spray may be adjusted without creating a hazardous machine and without increasing the required width of the machine.

Other objects and the nature and advantages of the instant invention will be apparent from the following description taken in conjunction with the accompanying drawings, wherein.

Figure 1:
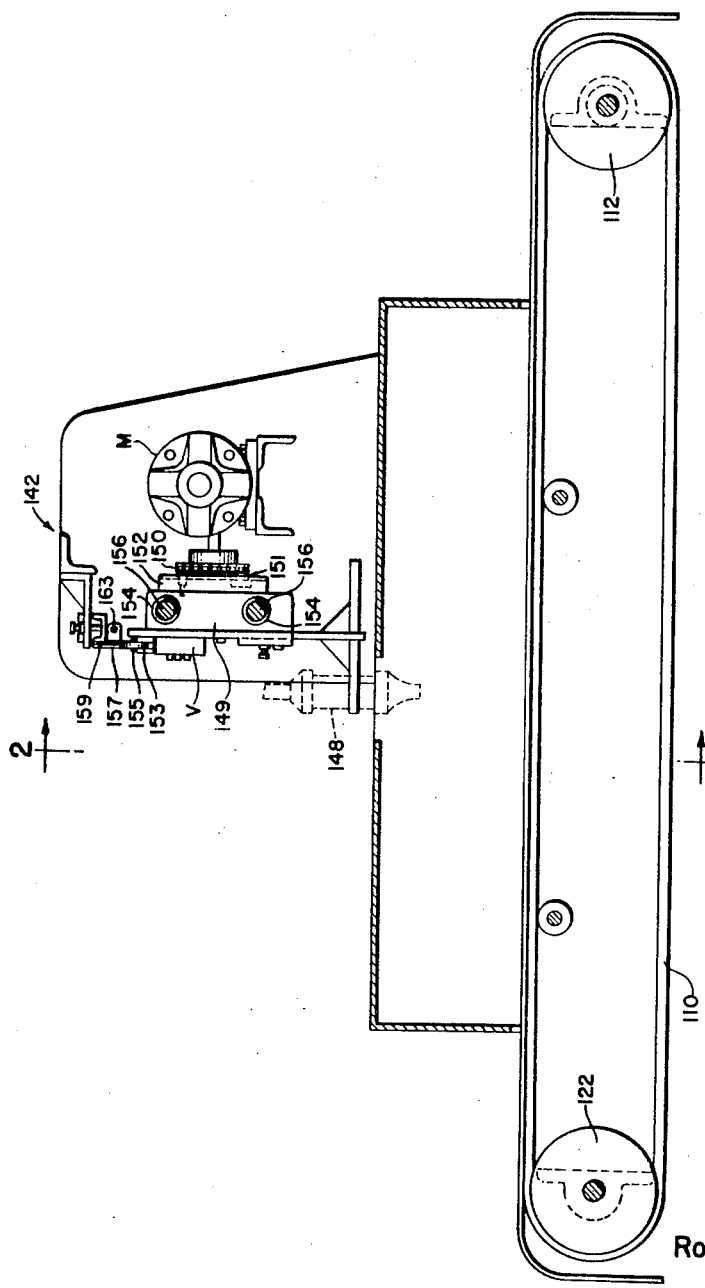
FIG. 1 is a side elevation, with parts in section, of a spray apparatus in accordance with the present invention.
Figure 2:
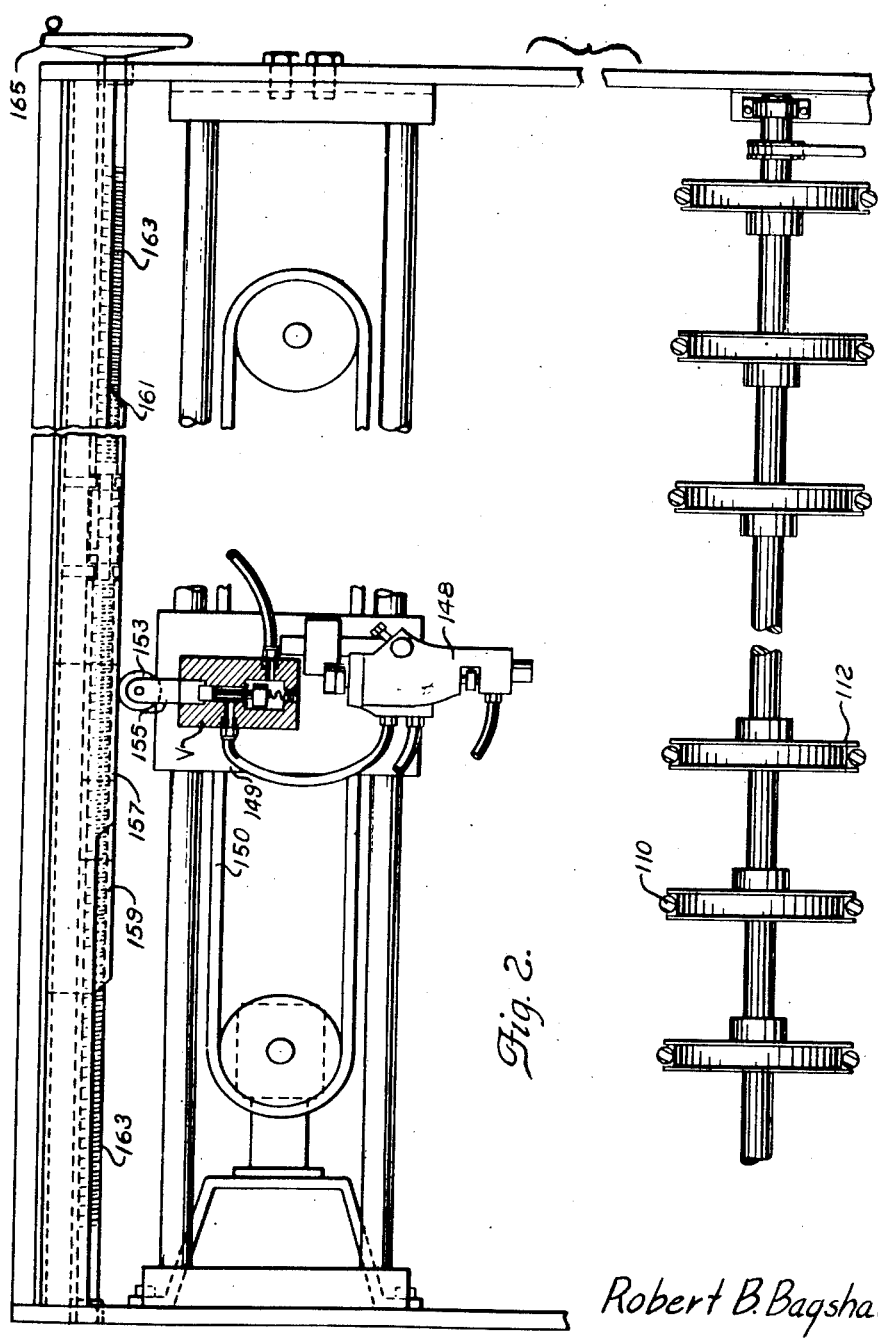
FIG. 2 is a cross sectional view taken on the line 2—2 of FIG. 1.

Referring to the drawings, there is shown in FIG. 1 a spray head assembly generally indicated at 142, assembly 142 being positioned above a conveyor that comprises wire ropes 110 trained about sheaves 112 and 122. As shown in FIG. 2 there are provided a plurality of such rope and sheath assemblies parallel to each other so as to provide a conveyor of considerable extent. As will be understood, one of the shafts that support the sheaves 112 and 122 at either end of the conveyor may have power supplied thereto. A transverse reciprocating spray gun 148 is carried by a carriage 149 and is reciprocated in a direction laterally of the path of travel of the wire ropes 110 forming the conveyor. This reciprocation is imparted to the spray gun carriage 149 by an endless chain 150 that is driven by a motor M. A drive bearing assembly 151, attached to the endless chain 150 and free to move vertically between two bearing plates 152 attached to the back of the carriage 149, transfers motion from the chain 150 to the gun carriage 149 and causes the spray gun carriage to reverse its direction of movement. Spray gun carriage 149 includes linear bearings 154 which move along fixed guides 156.

As shown in FIG. 2 the spray gun carriage 149 carries at its upper end a roller 153 mounted on arm 155, which controls the opening of the spray gun valve. The spray gun valve is generally designated V and comprises a valve member below the arm 155. The valve member and the arm 155 are spring-biased to a raised position in which the spray gun valve is closed. Appropriate conduits connect the valve to the spray gun and to a source of fluid supply. This valve V is well known in the art.

In order to control the opening of the spray gun valve V by moving arm 155 downwardly against its spring bias, cam means are provided, directly above the path of movement of roller 153. The cam means includes a fixed cam 157 and two movable cam segments 159 and 161. The length of fixed cam 157 laterally of the conveyor corresponds to the minimum width of spray desired. Movable cam segments 159 and 161 are in threaded engagement with a shaft 163 which is suitably supported by the spray head assembly 142. The respective cam segments 159 and 161 are threaded with opposite-handed threads so as to cause the two cam segments to move in opposite directions when shaft 163 is turned. Shaft 163 is turned by means of handwheel 165 to either retract cam segments 159 and 161 to a position in which they lie behind fixed cam 157, or to advance them to a position in which they extend beyond the opposite ends of fixed cam 157 to any desired extent. The combined effective lateral width of fixed cam 157 and the two adjustable cam segments 159 and 161 determines the length of the spraying stroke since engagement of roller 153 with any of the cams 157, 159, 161 is effective to open the valve of the spray gun.

By actuation of hand wheel 165, the cam segments 159 and 161 may be moved readily by a single operator, and it will be understood that the work supported conveyor, comprising the wire ropes 110, need not be stopped to permit this actuation. As the movement of the cam segments 159 and 161 are equal and opposite to each other, the part of the path of the spray gun 148 in which the valve V is open is always in the relative center of the work-supporting conveyor. The hand wheel 165 may readily accommodate an indicator (not shown) to show the width of the path in which the valve V is opened, and so the adjustment may be made rapidly and accurately.

There has been provided spray equipment in which a spray gun is caused to reciprocate over a work-supporting conveyor and in which the operative range of the spray gun may be readily adjustable by mechanism conveniently placed exteriorly of the equipment. The spray equipment of the present invention may be operated on a continuous basis, and need not be stopped to permit adjustment of the width of the spray path.

It will be obvious to those skilled in the art that various changes may be made without departing from the spirit of the invention and therefore the invention is not limited to what is shown in the drawings and described in the specification, but only as indicated in the appended claims.

What is claimed is:

1. A coating apparatus including a movable carriage, a conveyor extending beneath said carriage for supporting articles to be coated, a spray gun supported by said carriage, valve means including a valve operating member movable with said carriage for controlling flow of fluid to said spray gun, means for reciprocating said carriage in opposite directions along a fixed path, cam means positioned along said fixed path and engageable with said valve operator member and means for adjusting the effective length of said cam means to control the portion of said path in which said valve operator member engages said cam means, including a centrally disposed fixed raised cam member, oppositely movable end cam segments in contiguous overlapped relation therewith, said segments comprising internally threaded portions in axial alignment and of opposite thread, and a screw threaded shaft operatively engaged in said portions, whereby upon rotation of said shaft, said segments will be oppositely and simultaneously moved to enlarge or diminish the effective length of said cam means and the effective spray gun range.

2. A coating apparatus including a movable carriage, a conveyor extending beneath said carriage for supporting the articles to be coated, a spray gun supported by said carriage, valve means including a valve operating member movable with said carriage member for controlling flow of fluid to said spray gun, means for reciprocating said carriage in opposite directions along a fixed path, cam means positioned along said fixed path and engageable with said valve operator member and means for adjusting the effective length of said cam means from the center thereof to control the portion of said path in which said valve operator member engages said cam means, including cam segments oppositely movable from the center portion of said cam means, said segments comprising internally threaded portions in axial alignment and of opposite thread, and a screw threaded shaft operatively engaged in said portions, whereby upon rotation of said shafts said segments will be oppositely and simultaneously moved to enlarge or diminish the effective length of said cam means and the effective spray gun range.

3. A coating apparatus including a movable carriage, a conveyor extending beneath said carriage for supporting the articles to be coated, a spray gun supported by said carriage, valve means including a valve operating member movable with said carriage for controlling flow of fluid to said spray gun, means for reciprocating said carriage in opposite directions along a fixed path, cam means positioned along said fixed path and engageable with said valve operator member including a centrally disposed fixed cam member and movable end cam segments in contiguous overlapped relation therewith, and means for simultaneously relatively moving said cam segments whereby to adjust the effective length of said cam means, and the effective spray gun range.

4. The apparatus of claim 3, said last mentioned means including screw threaded shaft means operatively engaged with said cam segments.

5. A coating apparatus including a movable carriage, a conveyor extending beneath said carriage for supporting the articles to be coated, a spray gun supported by said carriage, valve means including a valve operating member movable with said carriage for controlling flow of fluid to said spray gun, means for reciprocating said carriage in opposite directions along a fixed path, cam means positioned along said fixed path and engageable with said valve operator member including a centrally disposed fixed cam member and movable end cam segments in contiguous overlapped relation therewith, and means for moving said cam segments simultaneously in opposite directions, whereby to vary the effective length of said cam means and the effective spray gun range.

6. A coating apparatus including a movable carriage, a conveyor extending beneath said carriage for supporting the articles to be coated, a spray gun supported by said carriage, valve means including a valve operating member movable with said carriage for controlling flow of fluid to said spray gun, means for reciprocating said carriage in opposite directions along a fixed path, cam means positioned along said fixed path and engageable with said valve operator member including a centrally disposed fixed cam member and movable end cam segments in contiguous overlapped relation therewith, and means for moving said cam segments equal amounts in opposite directions simultaneously, whereby to vary the effective length of said cam means and the effective spray gun range.

7. A coating apparatus comprising a movable carriage, a conveyor extending beneath said carriage for supporting the articles to be coated, a spray gun supported by said carriage, valve means including a valve operating member movable with said carriage for controlling flow of fluid to said spray gun, means for reciprocating said carriage in opposite directions along a fixed path, cam means positioned along said fixed path and engageable with said valve operator member, said cam means including a centrally disposed fixed raised cam member and a plurality of raised cam segments overlapping said fixed cam member and movable therefrom, and means for moving a pair of said cam segments simultaneously in opposite directions whereby the effective length of said cam means and the effective spray gun range is varied.

References Cited in the file of this patent

UNITED STATES PATENTS

| | | |
|---|---|---|
| 1,812,854 | Beach | July 7, 1931 |
| 2,003,778 | Willis | June 40, 1935 |
| 2,246,502 | Bransen et al. | June 24, 1941 |
| 2,610,605 | Paasche | Sept. 16, 1952 |
| 2,728,238 | Paasche | Dec. 27, 1955 |